Nov. 7, 1944.  A. H. MITTAG  2,362,294
ELECTRIC CONTROL CIRCUIT
Filed Oct. 1, 1941
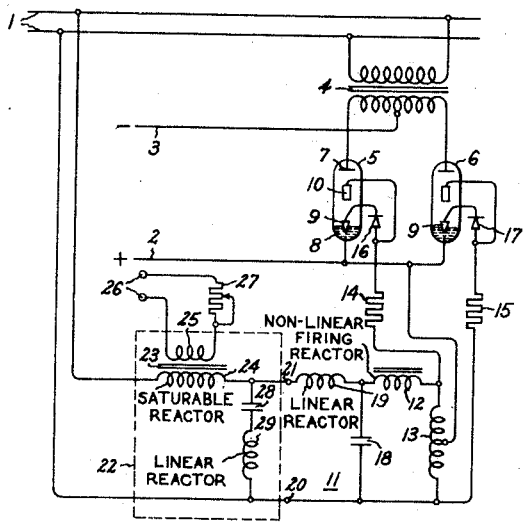
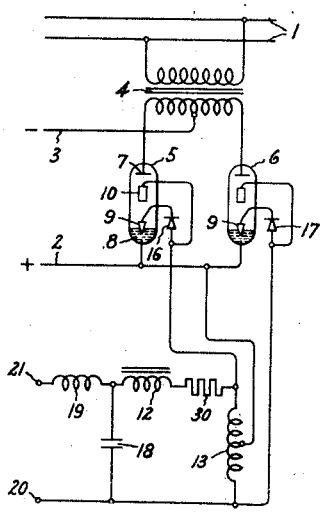
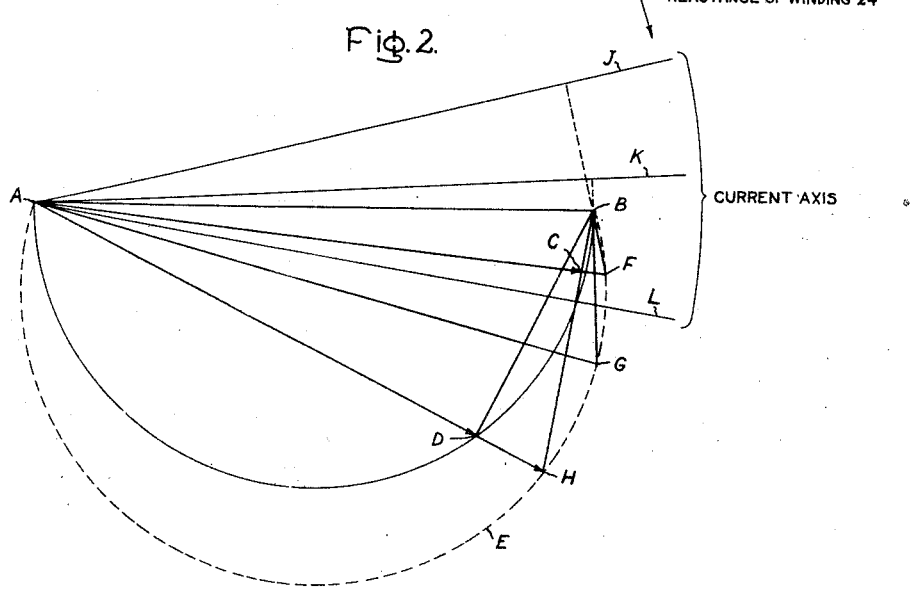
Inventor:
Albert H. Mittag,
by Harry E. Dunham
His Attorney.

Patented Nov. 7, 1944

2,362,294

UNITED STATES PATENT OFFICE 2,362,294

ELECTRIC CONTROL CIRCUIT

Albert H. Mittag, Schenectady, N. Y., assignor to General Electric Company, a corporation of New York Application October 1, 1941, Serial No. 413,232

13 Claims. (Cl. 250—27)

My invention relates to electric control circuits and more particularly to electric control circuits which comprise means for controlling or shifting the phase of the voltage applied to an alternating current output circuit with respect to the voltage of the alternating current supply circuit.

Heretofore there have been developed numerous phase shifting circuits of networks for the purpose of controlling the phase of the voltage supplied to an associated output or load circuit with respect to the voltage of an associated alternating current source or supply circuit. Many of the prior art arrangements have not been satisfactory for general application because of the many inherent limitations of the circuits. In accordance with the teachings of my invention described hereinafter, I provide a new and improved circuit which may not only be applied to systems generally where it is desired to control the phase of an output voltage, but which may also be applied to systems for controlling the phase of the voltage applied to the control member of an electric valve or electric discharge device.

It is an object of my invention to provide a new and improved electric valve circuit.

It is another object of my invention to provide a new and improved phase shifting circuit for controlling the phase of the voltage applied to an output circuit with respect to the voltage of an associated alternating current source.

It is a further object of my invention to provide a new and improved phase shifting circuit of the static impedance type for controlling the phase of the voltage impressed across an output circuit relative to the voltage of an alternating current supply circuit.

Briefly stated, in the illustrated embodiment of my invention I have shown my invention as applied to a system for controlling the voltage applied to an excitation circuit which in turn controls the voltage applied to the control member of an electric valve means or electric discharge device. The phase shifting circuit is not limited to such an application and is applicable generally to systems where it is desired to control the phase of an output voltage. More particularly, my invention is illustrated as applied to a system for controlling the phase of the alternating voltage applied to an excitation circuit. The phase shifting means comprises a variable impedance element having a reactance the sign of which is opposite to the net or resultant reactance of the excitation circuit, and which comprises means for maintaining the magnitude of the voltage applied to the excitation circuit substantially constant, or for preventing a substantial decrease in magnitude, for a range of different phase displacements between the voltage applied to the excitation circuit and the voltage of the associated alternating current supply circuit occasioned by variations in the magnitude of the reactance of the phase shifting means.

For a better understanding of my invention, reference may be had to the following description taken in connection with the accompanying drawing and its scope will be pointed out in the appended claims. Fig. 1 diagrammatically illustrates an embodiment of my invention as applied to an electric valve system such as a rectifying system, and Fig. 2 represents certain operating characteristics of the phase shifting circuit. Fig. 3 represents a modification of the arrangement shown in Fig. 1.

Referring now to Fig. 1 of the drawing, I have there illustrated my invention as applied to an excitation system for controlling electric valve translating apparatus. The electric valve translating apparatus may be a rectifier and is connected between an alternating current supply circuit 1 and a direct current load circuit comprising a positive conductor 2 and a negative conductor 3. The translating apparatus includes a transformer 4 and may include a pair of electric valve means 5 and 6 preferably of the type employing an ionizable medium, such as a gas or a vapor, and each comprises an anode 7 and a cathode 8. The electric valve means 5 and 6 also may include a control member, such as an immersion-ignitor type control member 9 constructed of a material such as boron carbide or silicon carbide and which has an electrical resistivity relatively large compared with that of the mercury of the associated pool cathode. Arc discharges between the anodes 7 and cathodes 8 are initiated by transmitting to the control members 9 a predetermined minimum value of current. The electric valve means 5 and 6 may also include transfer or relieving anodes 10 which effect the transfer of current from the control members 9 upon the initiation of arc discharges, thereby relieving the duty imposed on the control members 9.

I employ an excitation circuit 11 which energizes the control members 9 of electric valve means 5 and 6. The excitation circuit 11 may be of the type disclosed and claimed in my joint copending patent application Serial No. 374,716, filed January 16, 1941, and which is assigned to the assignee of the present application. The excitation circuit 11 transmits unidirectional impulses of current of peaked wave form to the control members 9 of electric valve means 5 and 6 and causes these electric valve means to conduct current alternately during intervals of time displaced substantially 180 electrical degrees. More particularly, the excitation circuit 11 comprises a non-linear reactance or firing reactor 12, an inductance 13, current limiting and stabilizing resistances 14 and 15 and unidirectional conducting devices 16 and 17. A capacitance 18 is also connected in the manner illustrated and serves to accentuate the impulses of voltage produced across the terminals of inductance 13. These impulses occur twice during each cycle of voltage of circuit 1 at times determined by the saturation of the nonlinear inductive reactance 12. A further reactance, preferably a linear reactance 19, is connected between the input terminals 20 and 21 of the excitation circuit and the capacitance 18 and serves to prevent discharge of the capacitance 18 to the supply circuit 1 or to the phase shifting circuit, described hereinafter, upon saturation of the nonlinear inductive reactance 12. The linear reactance 19 also serves to limit the amount of current derived from the supply circuit 1 through the phase shifting circuit 22 at the time the capacitance 18 is discharged.

The impedance of the excitation circuit 11 comprises a resistance component and a net reactive component of predetermined sign, such as an inductive reactance component. I provide a phase shifting circuit 22 which controls the phase of the voltage applied to the excitation circuit 11, and which maintains the magnitude of the voltage applied to the excitation circuit at a substantially constant value for a predetermined range of different phase displacements of the voltage with respect to the voltage of the supply circuit. It is to be understood that the circuit connected to terminals 20 and 21 of the excitation circuit constitutes a load or output circuit for the phase shifting circuit 22. Referring more particularly to the phase shifting circuit 22, I provide a variable impedance element having a reactance which cooperates with the resistance of the excitation circuit and constitutes therewith a phase shifting network. Furthermore, the variable impedance element of the phase shifting network 22 comprises a reactance of a sign corresponding to the net reactance of the excitation circuit 11. For example, inasmuch as the excitation circuit 11 comprises a net inductive reactance I provide a saturable inductive device 23 comprising a winding 24 which is connected in series relation with the supply circuit 1 and the excitation circuit 11. The saturable inductive reactance 23 is also provided with a suitable control means, such as a control winding 25, which may be manually controlled or controlled in response to a predetermined controlling influence such as the voltage of an associated circuit. In the arrangement illustrated, the control winding 25 is shown as being connected to be energized from an auxiliary source of direct current 26 through a current controlling resistance 27.

In the phase shifting circuit 22, I also provide means for maintaining the magnitude of the voltage supplied to the output circuit or the voltage applied to the excitation circuit 11 at a substantially constant value throughout an appreciable range of phase shift of the ouput voltage with respect to the voltage of circuit 1. More particularly, I employ a circuit comprising a reactive element having a reactance the sign of which is opposite to the sign of the net reactance of the excitation circuit 11 and the saturable inductive device 23. Inasmuch as the net reactance of the excitation circuit 11 is inductive, I provide a circuit in which the net reactance is capacitive. A capacitance 28 is employed in this circuit. As a means for suppressing undesirable oscillation and for preventing the transmission of voltages, due to the excitation circuit 11 to the supply circuit 1, I connect in series relation with the capacitance 28 an inductance 29. The capacitive reactance of capacitance 28 is substantially greater than the inductive reactance of inductance 29 and the difference therebetween is greater than the inductive reactance of excitation circuit 11.

The operation of the embodiment of my invention shown in Fig. 1 will be explained by considering the system when it is operating as a rectifier to supply unidirectional current to the load circuit. Electric valve means 4 and 5 conduct current alternately and the magnitude of the voltage impressed across the load circuit is determined by the times during the respective positive half cycles of applied anode-cathode voltage at which these electric valve means are rendered conducting with respect to the voltage of supply circuit 1. As the times of initiation of conduction are advanced, the magnitude of the voltage is increased, and as the times are retarded during the positive half cycles, the magnitude of the load voltage is decreased.

Excitation circuit 11 generates voltages of peaked wave form across the terminals of the inductance 13. The voltage appearing across the terminals of inductance 13 is an alternating voltage of peaked wave form in which the peaks are symmetrical. In this manner, electric valve means 5 and 6 are rendered conducting alternately and unidirectional current is transmitted to control members 9 of electric valve means 5 and 6 through resistances 14 and 15 and unidirectional conducting devices 16, 17, respectively.

The phase of the voltage applied to excitation circuit 11 may be varied by controlling the inductive reactance of device 23, and this may be accomplished by adjustment of resistance 27 to control the magnitude of the current transmitted to the control winding. It will be understood that as the magnitude of the current transmitted to winding 25 is increased, the magnetization of the device 23 increases, and as it approaches saturation the inductive reactance of the winding 24 substantially decreases. The inductive reactance of the device 23 or winding 24 constitutes, with the resistance of excitation circuit 11, a phase shifting network. As the magnetization of device 23 approaches the saturation point, the inductive reactance and the voltage drop appearing across winding 24 substantially decrease and the phase of the voltage impressed across terminals 20 and 21 approaches coincidence with the voltage of the supply circuit 1. Conversely, as the magnetization of the device 23 is decreased, the inductive reactance and the voltage drop appearing across winding 24 increases, causing a retardation in phase of the voltage impressed across terminals 20 and 21 with respect to the voltage of the supply circuit 1.

The circuit including capacitance 28 and inductance 29 serves to maintain the magnitude of the voltage supplied to excitation circuit 11 at a substantially constant value as the phase of the voltage is retarded with respect to the voltage of the supply circuit. This feature may be more fully appreciated by referring to the operating characteristics shown in Fig. 2.

Vector AB of Fig. 2 represents the voltage of the supply circuit 1. The full semi-circle represents the locus of the voltage which would be impressed across the excitation circuit 11 by use of the prior art arrangements where a variable inductance device is connected in series relation with a resistance. In such an arrangement it will be appreciated that as the phase angle of the output voltage is increased, the magnitude of the voltage must correspondingly decrease. For example, in Fig. 2 two values of phase displacement of the output voltage are represented by vectors AC and AD for different values of inductive reactance, BC and BD.

By the provision of the circuit including capacitance 28, the net reactance of which is of a sign opposite to the reactance of the excitation circuit, I provide an arrangement whereby the magnitude of the voltage supplied to the excitation circuit remains substantially constant or is not decreased for a definite range of phase displacement. By the use of the circuit having a net capacitive reactance, where the output circuit has a net inductive reactance, the output voltage of the phase shifting circuit, or the voltage impressed across the input terminals 20 and 21 of the excitation circuit 11, is made to follow the locus E. It will be observed that for a substantial range of phase shift, such as substantially 45 electrical degrees, the magnitude of the output voltage as represented by vectors AF, AG and AH remains substantially constant or at a value substantially greater than would be obtainable by merely using a variable inductance in series with a resistance.

Curves J—L, inclusive, represent the axes of the resultant series current which flows through winding 24 of inductive device 23 for different values of the inductive reactance of device 23. The inductive reactance voltage drops across winding 24 are represented by the vectors BF, BG and BH, corresponding to the current axes J—L, respectively. It will be noted that as the inductive reactance of winding 24 is increased, the power factor of the current transmitted to the phase shifting circuit 22 from the supply circuit 1 may change from a leading relationship to a lagging relationship with respect to the voltage of the supply circuit 1.

In Fig. 3 there is illustrated a modification of the arrangement shown in Fig. 1 where the resistances 14 and 15 of Fig. 1 are replaced by a single resistance 30 connected in series relation with the nonlinear inductive reactance 12. The function of this resistance 30 is substantially the same as that of resistances 14 and 15 in that it operates as a stabilizing means to assure that the positive and negative peaks of voltage appearing across transformer winding 13 are substantially uniform or symmetrical. The feature of employing a stabilizing resistance in an excitation system of this nature is disclosed and claimed in my above-identified joint patent application.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, an output circuit having a resistance and a resultant reactance of predetermined sign, and phase shifting means connected between said supply circuit and said output circuit and comprising a variable reactance element having a reactance of a sign corresponding to that of said output circuit and means connected across said output circuit for maintaining the magnitude of the voltage impressed thereacross substantially constant for different values of phase displacement of said output voltage relative to the voltage of said supply circuit occasioned by variations in the magnitude of said variable impedance and comprising a net reactance of a sign opposite to that of said output circuit.

2. In combination, a source of alternating current, an output circuit having a resistance and net inductive reactance, and a phase shifting circuit connected between said source and said output circuit for controlling the phase of the voltage supplied to said output circuit and comprising a saturable inductive reactance including a winding connected in series relation with said source and said output circuit and a circuit connected across said output circuit having a net capacitive reactance greater than the inductive reactance of said output circuit.

3. In combination, an alternating current supply circuit, an output circuit having resistance and a resultant inductive reactance, and phase shifting means connected between said supply circuit and said output circuit for controlling the phase of the voltage applied to said output circuit and comprising a saturable inductive reactance having a winding connected in series relation with said supply circuit and said output circuit and a circuit connected across said output circuit including in series relation a capacitance and an inductance, the last mentioned circuit being proportioned so that the net reactance of said circuit is capacitive and of a greater magnitude than the inductive reactance of said output circuit.

4. In combination, an alternating current supply circuit, an output circuit having a resistance and a net inductive reactance, and phase shifting means connected between said supply circuit and said output circuit for shifting the phase of the voltage applied to said output circuit and comprising a variable inductive reactance having a winding connected in series relation with said supply circuit and said output circuit, said resistance of said output circuit constituting with said inductive reactance a phase shifting network and a capacitive circuit connected across said output circuit for maintaining the voltage impressed across said output circuit substantially constant for a range of different phase displacements of the output voltage determined by different values of said inductive reactance.

5. In combination, an alternating current supply circuit, an output circuit having a resistance and a net inductive reactance, and a phase shifting circuit connected between said supply circuit and said output circuit for controlling the phase of the voltage applied to said output circuit and comprising a saturable inductive device having a winding connected in series relation with said supply circuit and said output circuit, said resistance of said output circuit constituting with the inductive reactance of said device a phase shifting network and a circuit connected across said output circuit including in series relation a capacitance and an inductance proportioned so that the net reactance of the last mentioned circuit is predominately capacitive.

6. In combination, an electric valve means comprising a control member, an excitation circuit connected to said control member, an alternating current supply circuit, and phase shifting means connected between said excitation circuit and said supply circuit and comprising a saturable inductive device having a winding connected in series relation with said excitation circuit, the resistance of said excitation circuit and the inductive reactance of said device constituting a phase shifting network and a circuit connected between said device and said excitation circuit and comprising a capacitance the capacitive reactance of which is greater than the inductive reactance of said excitation circuit.

7. In combination, an electric valve means having a control member, an excitation circuit connected to said control member the impedance of said excitation circuit comprising a resistance component and an inductive reactance component, an alternating current supply circuit, and phase shifting means connected between said supply circuit and said excitation circuit and including a saturable inductive device comprising a winding connected in series relation with said supply circuit and said excitation circuit and a circuit connected between said device and said excitation circuit and having a capacitive reactance substantially greater than the inductive reactance of said excitation circuit for maintaining the voltage applied to said excitation circuit substantially constant in magnitude for a predetermined range in phase shift occasioned by variations in the magnitude of the reactance of said device.

8. In combination, an electric valve means having a control member, an excitation circuit connected to said control member, the impedance of said excitation circuit comprising a resistance component and a net inductive reactance component, an alternating current supply circuit, and phase shifting means connected between said supply circuit and said excitation circuit and comprising a saturable inductive device having a winding connected in series relation with said excitation circuit, the inductive reactance of said device constituting with the resistance of said excitation circuit a phase shifting network, and means connected between said winding and said excitation circuit for maintaining the magnitude of the voltage supplied to said excitation circuit substantially constant for a range of different phase displacements of the voltage applied to said excitation circuit occasioned by variations in the magnitude of the inductive of said device.

9. In combination, an electric valve means having a control member, a source of alternating current, and an excitation circuit for transmitting an impulse of current to said control member comprising a capacitance, a saturable nonlinear inductive reactance arranged to saturate within the normal range of operating current of said excitation circuit and connected to said capacitance for effecting discharge of said capacitance and a linear inductive reactance connected between said source and said capacitance and in the charging circuit of said capacitance for limiting the amount of current derived from said source upon discharge of said capacitance.

10. In combination, an electric valve means having a control member, a source of alternating current, and an excitation circuit for transmitting an impulse of current to said control member comprising a capacitance connected to be charged from said source, an impedance element, a saturable inductive reactance connected between said capacitance and said impedance element for abruptly discharging said capacitance through said impedance element and a linear inductive reactance connected between said source and said capacitance for limiting the amount of current derived from said source when the inductive reactance of the saturable reactance abruptly decreases.

11. In combination, an alternating current supply circuit, a load circuit, a control circuit for transmitting an impulse of current to said load circuit comprising a capacitance, a saturable nonlinear inductive reactance arranged to saturate within the normal range of operating current of said load circuit, means connecting said reactance and said load circuit in series and to said capacitance to establish a discharge circuit therefor, and means including a substantially linear inductive reactance connecting said capacitance with said source to provide a circuit for the transfer of alternating current energy from said source to said capacitance and to offer substantial impedance between said source and said capacitance during discharge of said capacitance.

12. In combination, an alternating current supply circuit, a load circuit, a control circuit for transmitting an impulse of current to said load circuit comprising a capacitance, a circuit including a substantially linear inductive reactance connecting said capacitance and said source, said inductive reactance providing means for controlling the transfer of current between said capacitance and said source, a saturable nonlinear inductive reactance arranged to saturate within the normal range of operating current of said load circuit, means connecting said nonlinear inductive reactance and said load circuit in series and to said capacitance to establish a discharge circuit therefor, said nonlinear inductive reactance being symmetrically saturable with respect to the magnitude of the current transmitted thereto to supply an impulse of current to at least a portion of said load circuit during each half cycle of voltage of said alternating current supply circuit.

13. In combination, a source of alternating current, an output circuit having a resistance and a net inductive reactance, and a phase shifting circuit connected between said source and said output circuit for controlling the phase of the voltage supplied to said output circuit and comprising a variable inductive reactance including a winding connected in series relation with said source and said output circuit, means for varying the magnitude of said last-mentioned inductive reactance, and a circuit connected across said output circuit having a net capacitative reactance of such magnitude that the current transmitted to said circuit and said output circuit through said variable inductive reactance maintains the voltage impressed on said output circuit substantially constant for different values of said variable inductive reactance.

ALBERT H. MITTAG.

CERTIFICATE OF CORRECTION.

Patent No. 2,362,294. November 7, 1944.

ALBERT H. MITTAG.

It is hereby certified that error appears in the printed specification of the above numbered patent requiring correction as follows: Page 4, first column, line 54, claim 8, after "inductive" insert --reactance--; second column, line 63, claim 13, for "capacitative" read --capacitive--; and that the said Letters Patent should be read with this correction therein that the same may conform to the record of the case in the Patent Office.

Signed and sealed this 30th day of January, A. D. 1945.

(Seal)

Leslie Frazer
Acting Commissioner of Patents.